Dec. 16, 1969 M. BONNEMAY ET AL 3,484,292
ELECTROCHEMICAL GENERATORS UTILIZING GASEOUS FUELS AND/OR GASEOUS OXIDIZERS
Filed Feb. 14, 1966 7 Sheets-Sheet 1
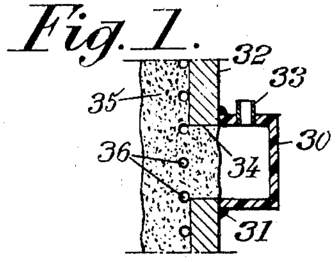
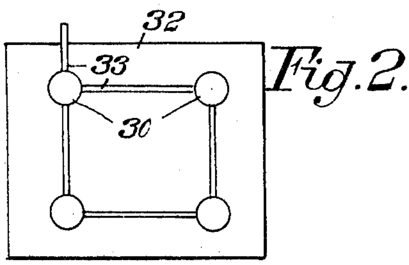
Fig. 2.
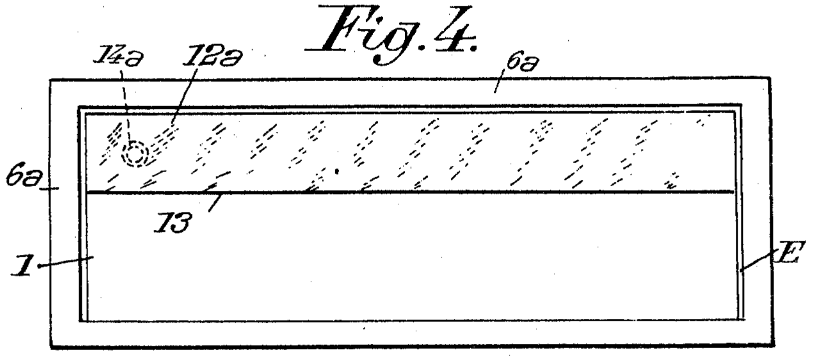
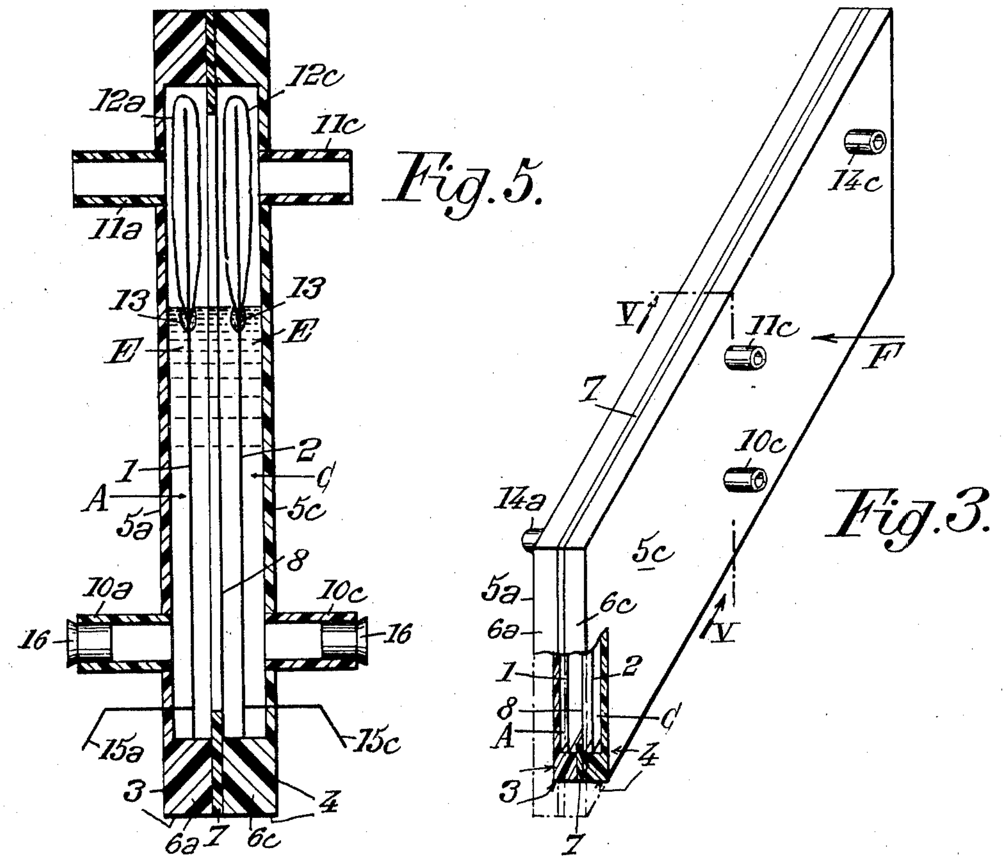
Fig. 5. Fig. 3.

United States Patent Office 3,484,292

Patented Dec. 16, 1969

3,484,292

ELECTROCHEMICAL GENERATORS UTILIZING GASEOUS FUELS AND/OR GASEOUS OXIDIZERS

Maurice Bonnemay and Guy Bronoel, Boulogne, and Eugene Levart, Issy-les-Moulineaux, and Denis Doniat, Le Perreux-sur-Marne, France, assignors to Centre National de la Recherche Scientifique, Paris, France

Filed Feb. 14, 1966, Ser. No. 526,987
Claims priority, application France, Feb. 18, 1965, 6,107, Patent 1,433,558; July 9, 1965, 24,153; Dec. 8, 1965, 41,451
Int. Cl. H01m *27/06*
U.S. Cl. 136—86 14 Claims

ABSTRACT OF THE DISCLOSURE

The invention relates to an electrochemical generator comprising a first compartment filled with an electrolyte and second compartments supplied with fuel and/or oxidant gases, separate from the first compartment. The electrodes, including an electrically conductive support covered with a porous material supporting the catalyst, have parts submerged in the electrolyte within the first compartment and other parts projecting in those of said second compartments supplied with the gas corresponding to their polarity. The supply gases adsorbed in the parts of the electrodes projecting in the second compartments diffuse into the submerged parts of the electrodes, within the porous material, and along general direction parallel to the outer faces of the electrodes.

This invention relates to electrochemical generators utilizing gaseous fuels and/or gaseous oxidizers in which the chemical energy of a fuel which may be gaseous is converted directly into electrical energy by the oxidation of said fuel at the negative electrode, or anode, and by the reduction of a gaseous oxidizer (hereinafter referred to as the gaseous oxidant) which may be gaseous too at the positive electrode, or cathode.

It is the principal object of the invention to provide an improved electrochemical generator, in particular with respect to its simplicity of design, its power per unit weight and the lower cost of the electric power supplied.

It is another object of the invention to provide an electrochemical generator having a compact structure and using electrodes consisting of thin plates.

It is a further object of the invention to provide an electrochemical generator utilizing gaseous fuels and/or gaseous oxidizers which may be supplied to the electrodes under low pressure, and in particular to supply the cathode with air.

It is still another object to improve the simultaneous contact between the electrode, the electrolyte and the gaseous supply and in particular to dispense with the elaboration of a macroscopic surface of triple contact between these elements such elaboration becoming particularly difficult in the case where thin electrodes are used.

More particularly it is the object of the invention to provide a generator which is characterized in that it comprises at least one electrode part of which (supply zone of the electrode) is in contact with the supply gaseous fuel or gaseous oxidant, depending on the polarity of the electrode considered, another part of which (active zone of the electrode) is in contact with the electrolyte, said electrode being constituted by an electrically conductive structure covered with a substance, preferably active carbon, supporting the catalyst of the electrochemical reaction and having a porous consistency which enables an electrolyte to easily penetrate into said active zone of the electrode, said substance further exhibiting a great specific surface, thereby enabling a rapid diffusion of said gaseous fuel or gaseous oxidant from said supply zone into said active zone of the electrode, whereby said supply zone may be very small as compared with said active zone and the distribution of the areas, where the substance of the electrode, the supply gas and the electrolyte come simultaneously in contact, is substantially homogeneous throughout the mass of said active zone.

Further objects of the invention will appear as the following description proceeds with reference to the accompanying non-limitative exemplary drawings in which:

FIGURE 1 shows in section a possible form of embodiment of a detail of a generator according to the invention;

FIGURE 2 is a plan view of another possible form of embodiment of the same detail;

FIGURE 3 is an overall perspective view with fragmental cutaway of a first constructional form of the subject generator of the invention;

FIGURE 4 shows in elevation, on a different scale and with a component part removed, a section of the generator of FIGURE 3 along arrow F, the detail illustrated in FIGURES 1 and 2 being shown in a third possible embodiment thereof;

FIGURE 5 is a section on an enlarged scale taken through the line V—V of FIGURE 3;

Figure 6:
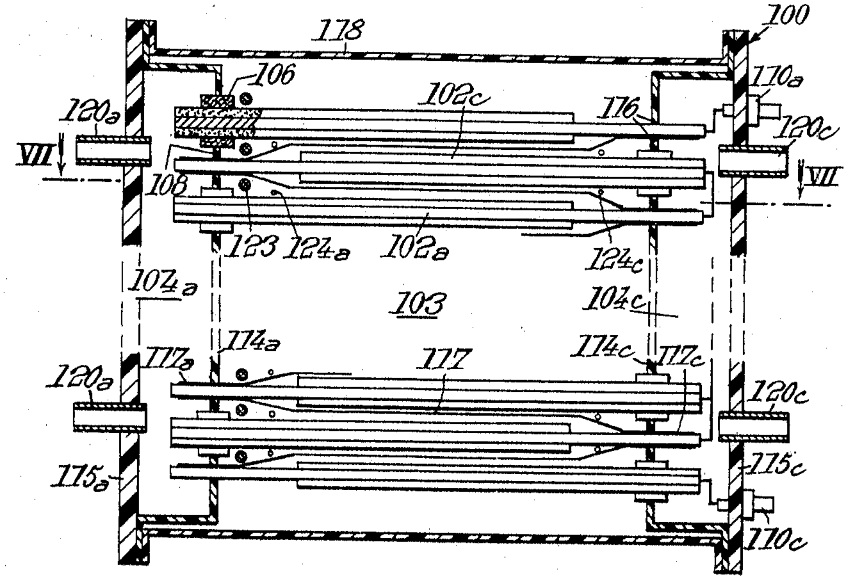
FIGURE 6 shows in section through a horizontal plane a second possible constructional form of an electrochemical generator according to the invention, comprising a plurality of electrodes of each polarity interconnected in series.

Disregarding at this stage the subject improvements of the invention to be incorporated in them, the generators referred to above may all be devised in any convenient manner, or as shown in the drawings for example, by having them include at least one anode compartment adapted to contain at least one anode, and at least one cathode compartment adopted to contain at least one cathode, the anode and cathode compartments being separated by means of a partition wall or separator the dimensions and possibly also the nature of which are such as to prevent contact between the electrodes and the mixture of fuel and oxidant gases contained respectively in said two compartments.

The anode and cathode compartments are at least partly filled with electrolyte, consisting for instance of a potassium solution.

It is known that it is difficult with the known electrodes to control the composition of the same, the pressure of the supply gases, specially in the case of thin electrodes, in order to form a macroscopic surface of triple contact between the catalytic mass of the electrodes, the electrolyte and the supply gases.

These difficulties are substantially overcome in the electrochemical generator of the invention which is characterized in that it comprises at least one electrode part of which (supply zone of the electrode) is in contact with the supply gaseous fuel or gaseous oxidant, depending on the polarity of the electrode considered, said electrode being constituted by an electricity conducting structure covered with a substance, having a porous consistency, preferably with active carbon, which supports the catalyst of the electrochemical reaction and which is able to be easily penetrated by the electrolyte (active zone of the electrode), said substance exhibiting in particular a great specific surface thereby enabling a rapid diffusion of said supply gas from said supply zone of the electrode into said active zone of the electrode, whereby said supply zone might be very small as compared with said active zone and the distribution of the spots or areas where the porous substance, the electrolyte and the supply gas come simultaneously in contact is substantially homogeneous throughout the mass of the active zone.

In many of the embodiments of the invention contemplated hereafter a portion of each electrode is submerged in an electrolyte contained in a chamber, with a further portion at least of each electrode being segregated from said chamber and in contact with either the fuel gas or the oxidant gas, depending on the polarity of the electrode considered.

The electrically conductive structure of the electrodes may consist, say, of metal grids or plates made of nickel in the case of the anodes and silver or nickel in the case of the cathodes. Alternatively, such structures may consist of any convenient electrically conductive supports, an example being plastic supports covered with a metallic deposit.

Considering next the substance of porous consistency covering such metal grids it consists advantageously of active carbon which supports the catalyst. For instance the electrodes are constituted with palladized active carbon for the anodes and silvered active carbon for the cathodes.

The active carbon used as the basic material for the catalyst is powdered carbon of high specific area, obtainable, for instance, at temperatures of about 1000° C. from charcoal. Good results have been achieved with the activated carbon sold under the designation Charbon Actif Super C. The silvered active carbon for covering the cathodes can be obtained by treating the aforementioned activated carbon by immersion in a solution of ammoniacal silver nitrate containing glucose, while the palladized active carbon for covering the anodes can be obtained by treating said active carbon by immersion in a concentrated palladium chloride solution, the purpose of this immersion being to transfer the palladium on to the active carbon.

To fix ideas, it may be indicated by way of nonlimitative example that, in order to treat 1.5 g. of Charbon Actif Super C for use as a cathode catalyst, recourse may conveniently be had to 50 ml of ammoniacal silver nitrate concentrated to about 6% or more, to which is added a glucose solution likewise concentrated to around 6%, as it is poured over the active carbon. The silver precipitate formed as a result deposits on the active carbon particles. The cathode catalyst obtained thus is filtered, then washed and dried before being mixed with a binding agent consisting, for instance, of a dissolution of methyl methacrylate in trichloroethylene, this mixture being then spread or preferably sprayed on to said nickel or silver grids, its cohesive property being adequate for it to form a persistent unbroken coating.

Again by way of non-limitative example and to fix ideas, it is to be noted that in order to treat 10 g. of active carbon intended for use as an anode catalyst, recourse may be had to 330 ml. of a solution containing 5 g. or more of palladium chloride, with a concentration of 35% of palladium per litre. This solution is poured over the active carbon and the palladium is thus transferred on to the active carbon particles. Here again the catalyst is washed and dried, then mixed with a binding agent, such as for instance the agent used for the cathode catalyst, after which the mixture is spread or sprayed on to said silver or nickel grids to obtain a persistent unbroken coating.

By reason of the properties selected in accordance with this invention for said catalysts, which properties are most notably possessed by those catalysts which are prepared as described hereinabove, it will suffice for a portion at least of each electrode to project into a chamber containing fuel gas or oxidant gas (depending on the polarity of the electrode), and these fuel and oxidant diffuse very rapidly through the catalyst coating on the electrodes and are thus carried to all points in the mass thereof, i.e., to all points on the reactive liquid/solid interface referred to precedingly once the electrodes have been at least partly submerged in an electrolyte.

One of the advantages of the generators according to the invention stems from the fact that, by virtue of the catalysts, the electrode portion supplied with gas in this way may be small in relation to the portion submerged in the electrolyte.

According to an advantageous embodiment of the invention the gas supply of the electrode may be performed by means of D-shaped elements 30, comprising a gas inlet port 33, (FIG. 1) bonded as at 30 onto an electrode constituted as disclosed hereabove or, as is represented in FIG. 1, onto an assembly constituted with a plate 32, made of a plastic material, provided with ports 34 in register with the D-shaped elements 30 and upon which active carbon supporting the corresponding catalyst has been spread or sprayed in a layer 35, the carbon also filling ports 34. The electrically conductive structure is then constituted by a metallic grid 36 bonded to said plate 32.

It goes without saying that, where the electrodes are of relatively large size, they may be supplied with gas through a plurality of such ports 34 distributed over the surface of the electrodes so as to supply all points thereon as uniformly as possible, as illustrated by the form of embodiment of FIGURE 2.

In accordance with a preferred constructional form shown in FIGURES 3 to 5, the subject generators of this invention are designed to include an anode compartment A and a cathode compartment C which contain an anode 1 and a cathode 2, respectively.

As FIGURES 3 and 4 clearly show, the generator illustrated thereon is of shallow rectangular shape and consist basically of two hollow juxtaposed drawer-shaped elements 3 and 4 obtained by dividing the rectangular unit into two possibly symmetrical parts along a plane parallel to the sides having the largest area. Each of the elements 3 and 4 is formed with a flat surface *5a* and *5c* respectively and a flange *6a* and *6c* respectively, whereby to provide cavities forming said compartments A and C respectively. When joining the elements 3 and 4 together, a frame 7 having outer dimensions equal to those of flat surfaces *5a* and *5c* (see FIGS. 3 and 5) is placed between flanges *6a* and *6c*. Secured to frame 7, by bonding for instance, is a sheet 8 made of a substance which though gastight will allow electrical charges to flow therethrough when an electrolyte is in contact with both its faces. Sheet 8, which may be made of nylon fabric for example, acts as a separator between compartments A and C. Manifestly, a second similar sheet could be bonded to the other side of frame 7.

Recourse may be had to bonding for joining elements 3 and 4 after placement of frame 7 therebetween. Said elements and frame may be made, for instance, of methylmethacrylate.

In lieu of providing a separator by means of sheet 8, use could be made of an individual bag for each electrode, made of the same material as sheet 8.

Compartments A and C communicate with the exterior of the generator through lower outlets 10*a* and 10*c*, respectively, and through upper outlets 11*a* and 11*c*, respectively, the functions of which will be described hereinafter.

An anode 1 is positioned inside compartment A (FIG. 4) and a cathode 2 inside compartment C (FIGS. 3 and 4), both being rectangular and of height and width somewhat less than those of said compartments.

These electrodes are devised as hereinbefore described with regard to their electrically conductive structure and the catalyst according to the invention covering the same, whilst the supply of gas thereto is ensured according to the invention by enclosing them partly (the upper end in the case of the generator described) in gastight bags 12*a* and 12*c* respectively. Clearly, a plurality of such bags could be provided for each electrode, examples being a first bag for the upper edge and a second bag for the lower edge, or two bags placed over the lateral vertical edges respectively. Bags 12*a* and 12*c* may be made of nylon for instance and be united with the surface of the respective electrodes with glue as at 13.

Each bag may be supplied with gas (fuel gas or oxidant gas, depending on the polarity of the electrode) through ports 14*a* and 14*c* respectively (FIGS. 3 and 4) extending through the flat surfaces 5*a* and 5*c* respectively of elements 3 and 4 and connectable to gas sources (not shown).

The generator will be caused to deliver electric current when bags 12*a* and 12*c* have been filled with fuel gas and oxidant gas respectively at a slight overpressure corresponding to a few millimetres of mercury, compartments A and C with electrolyte (potassium 5 N for example) up to the level of glue at 13 using ports 10*a* and 10*c* (which may be sealed with plugs 16), and the electric circuit finally closed by interconnecting, through a resistor or any suitable measuring instrument (not shown), the electric leads 15*a* and 15*c* welded to the corresponding electrode grids.

When said electric circuit is opened or when either of the electrodes presents a weakness, fuel gas and oxidant gas may be given off at the edges of the electrodes in the form of bubbles, and provision is therefore made for the ports 11*a* and 11*c* referred to precedingly in order to enable such unused gas to be either discharged or recycled.

For indicative purposes it may be stated that the generator just described, the electrodes of which weight 15 grams each and measure 150 x 40 mm., and each compartment of which contains 11.5 g. of electrolyte, is capable of furnishing a power of 1 w. at ambient temperature.

In the forms of embodiment shown in FIGURES 6 through 14, the greatest part of each electrochemical generator electrode is submerged in an electrolyte contained in a first compartment, the remaining part of each electrode projecting respectively into different compartments distinct from the first and filled with oxidant gas or fuel gas according to the polarity of the electrode. These compartments are segregated by causing that portion of the generator structure which separates the two compartments (whilst leaving a passageway for the electrodes) to be joined to the electrodes by depositing resin on the respective regions of the electrodes which separate their portions submerged in the electrolyte from those projecting into the gas-filled compartments, said resin being such that its ability to penetrate the porous catalytic electrode coatings is limited at the most to part of the thickness thereof and that it forms a leakproof joint therewith.

It is thus possible to provide, through preferred forms of embodiment of the invention, an electrochemical generator having a central compartment for the electrolyte and two further side compartments one of which contains a fuel gas such as hydrogen and the other an oxidant gas such as oxygen or air, an anode or anodes, and a cathode or cathodes, the greater parts of which are immersed in the electrolyte while their remaining parts project into the two latter-mentioned compartments respectively. This arrangement can be used alike for individual electrochemical cells with a single electrode of each polarity and for batteries of high power per unit weight comprising a plurality of electrodes for each polarity.

In the constructional form shown in FIGURES 6 through 9, the major portions of anodes 102*a* and cathodes 102*c* are immersed in an electrolyte contained in a central compartment 103 of generator 100, with said anodes 102*a* and cathodes 102*c* projecting into lateral compartments 104*a* and 104*c* supplied, respectively, with fuel gas such as hydrogen and oxidant gas such as air, central compartment 103 being separated from lateral compartments 104*a* and 104*c* by means of a resin deposit 106 on that portion of each electrode which is intermediate the portion immersed in the electrolyte in central compartment 103 and the portion in contact with either the fuel gas or oxidant gas (depending on the electrode polarity) contained respectively in anode compartment 104*a* and cathode compartment 104*c*. The resin chosen for the deposit 106 is such that its ability to penetrate the porous catalytic coatings on said electrode is limited to part only of the thickness thereof, as schematically represented by the dash-line 107 in FIGURE 8, and that it forms a leakproof bond therewith. Further, deposit 106 forms connecting flanges uniting it with the generator structure, i.e., with elements 108 thereof by welding or bonding as at 109.

Figure 8:
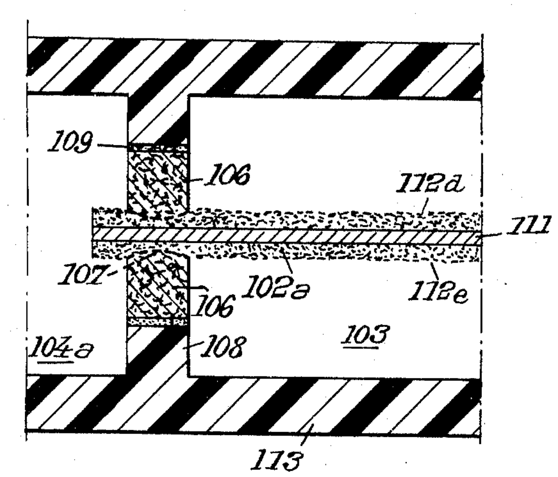
FIGURE 8 is a sectional view of an embodiment of a detail according to the invention, in particular in the electrochemical generator of FIGURES 6 and 7.
Figure 9:
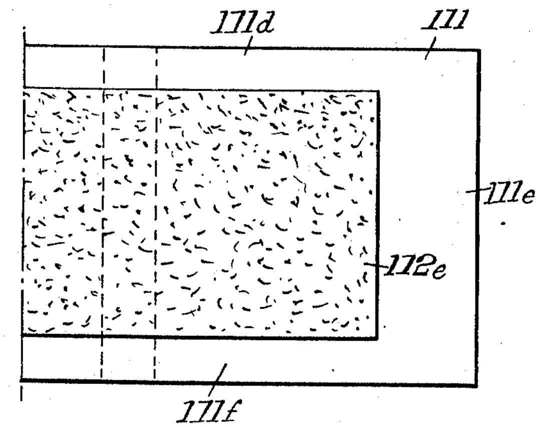
FIGURE 9 shows in elevation an electrode according to the invention usable with advantage in a generator of the kind shown in FIGURES 6 and 7.

FIGURE 8 shows in greater detail, in an electrochemical cell comprising at least one electrode, the formation of a leakproof partition wall integral with the generator structure and bearing against an electrode, for instance an anode 102*a*, of which the major portion is immersed in electrolyte and the smaller remainder portion in contact with a supply gas.

Anode 102*a* thus includes a support 111 covered on both sides with porous catalytic coatings 112*d* and 112*e*. In the interests of simplifying the description, FIGURE 8 refers to the specific instance wherein a single electrode is mounted in an enclosure 113.

The resin is deposited on the electrode area intermediate the portion to be immersed in the electrolyte and the portion which is to be in contact with the supply gas, whereby a connecting flange 106 can be formed on either side of the electrode. Recourse may be had to any resin capable of adhering to the porous support formed by the coating of catalytic substance yet having limited ability to penetrate the same. Particularly good results may be obtained for example with the silicone-base resin sold under the trade name KAF or with resins known under the name of "araldites." These resins will set under the effect of atmospheric humidity and produce on such electrodes a deposit of relatively plastic consistency which adheres strongly thereto. The unit formed by electrode 102*a* and flanges 106 can then be fitted into an enclosure 113 preferably made of a plastic resin such as that known by the trade name Lucoflex. Enclosure 113 is devised with connecting elements 108 which define an opening in which flanges 106 are accommodated. The unit comprising electrode 102*a* and flanges 106 can be finally secured in position either by bonding as at 109 or by pouring thereat a diluted quantity of said resin between enclosure connecting flanges 108 and resin flanges 106, such dilution being necessary in most cases due to the shortage of available space. In the particular case of electrochemical generators having a plurality of electrodes of the same polarity, the electrode/resin-flanges unit hereinabove disclosed may be placed directly adjoining identical units on either side thereof, as illustrated diagrammatically for exemplary purposes in FIGURE 10.

In both cases (see FIGS. 8 and 9), there is thereby provided a partition wall which completely separates the electrode portions immersed in the electrolyte from the portions in contact with the supply gases and which defines a compartment containing the electrolyte and compartments distinct therefrom for the supply gases.

Due to its limited penetration depth, the resin of deposit 106 in the midst of the coats of catalytic substance 112*d* and 112*e* has no effect for all practical purposes on the process of diffusion of the supply gases through the body of said coats.

Figure 10:
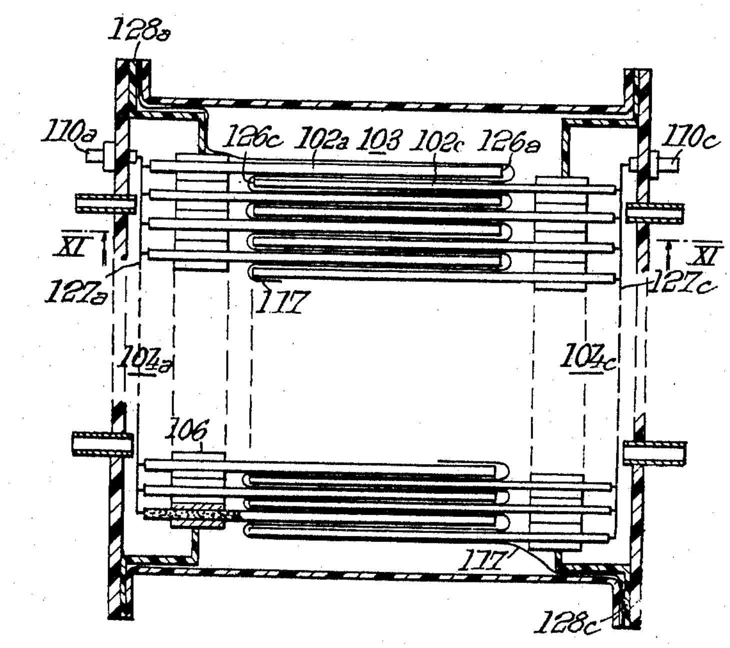
FIGURE 10 is a diagrammatic section on a horizontal plane through an alternative constructional form of the electrochemical generator of FIGURES 6 and 7, comprising a plurality of parallel-connected electrodes of each polarity.

FIGURES 6, 7 and 10 to 13 show different possible methods of positioning the electrode resin flange units according to the invention in electrochemical generators having a plurality of electrodes of identical polarity, with said electrodes being either assembled as described with reference to FIGURE 10, or fitted as in FIGURE 6, wherein the electrode resin flange units 102*a*–106 or 102*e*–106 are interconnected through connecting elements 108 to form partitions 114*a* and 114*c* for two enclosures bounding, respectively, an anode compartment 104*a* and a cathode compartment 104*a* located on either side of the central compartment 103 designed to contain the electrolyte, said enclosures including two opposite external lateral faces 115*a* and 115*c* of electrochemical generator 100. Compartments 104*a* and 104*c* are supplied with oxidant gas and fuel gas, respectively, through ports 120*a* and 120*c*, respectively.

Figure 7:
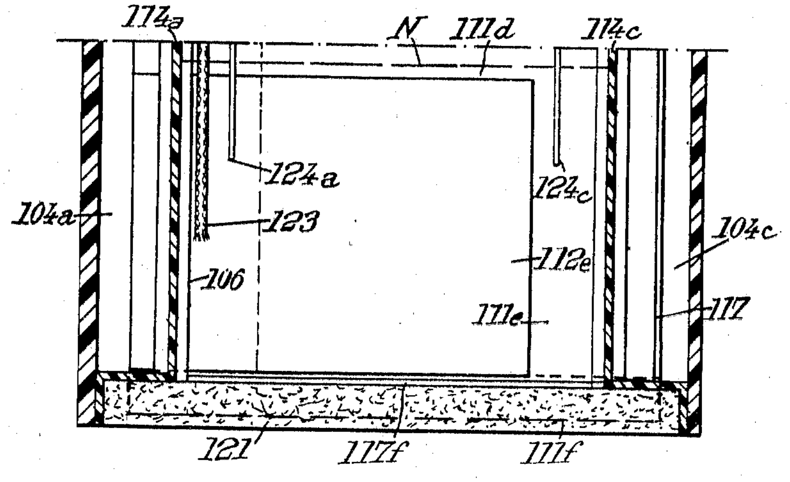
FIGURE 7 is a section taken on the vertical plane through VII—VII of FIGURE 6.

FIGURES 6 and 7 illustrate more particularly an electrochemical generator of high power per unit weight wherein the electrodes are series-connected to produce a high voltage current of relatively low intensity which can be picked up across terminals 110*a* and 110*c* carried on partition wall 115*c* for example.

Such series connection requires the formation of individual electrolytic cells, each having a single anode 102*a* and a single cathode 102*c*. In providing these individual cells recourse may conveniently be had to cathodes and anodes devised as shown diagrammatically in FIGURE 9, and these electrodes includes an electrically conductive non-porous supporting plate 111 which projects over three of its sides 111*d*, 111*e*, 111*f* from the coatings of active catalytic substance 112*d* and 112*e* formed on each of its sides. In a preferred form of embodiment of the invention, supporting plates 111 act as segregation means between individual electrolytic cells, with the cathodes alternating with the anodes in such manner as to obtain in each cell a porous catalytic anode coating facing a porous catalytic cathode coating.

The lateral edge 111*e* not covered with catalytic substance of the support 111 of, say, an anode 102*a* extends into cathode compartment 104*c* and is secured to the partition wall 114*c* thereof, by welding or bonding for instance, as at 116. The cathodes 102*c* are mounted in the cell in the same way, between anodes 102*a*, with the lateral cathode edge 111*e* devoid of catalytic cathode deposit being mounted in the partition 114*a* of anode compartment 104*a*, again by welding or bonding for example.

Additionally provided are sheets, made for instance of porous nylon fabric, which form separators 117 in the electrolytic cells formed thus between the cathodes and the anodes, and the lateral edges of separators 117*a* and 117*c* are preferably bonded to the lateral edges 111*e* devoid of catalytic substance of the electrodes of opposite polarity in each electrolytic cell constituted in this manner and are mounted in partition walls 114*a* and 114*c* together with the latter-mentioned edges. Two lateral partition walls 118 are additionally provided for the lateral faces of the electrochemical generator, being mounted for instance directly adjoining partition walls 115*a* and 115*c*.

In completing the insulation for the individual electrolytic cells in this series-connection arrangement, care must be exercised to ensure that the lateral edges 111*f* devoid of active catalytic coatings, together with the lower lateral edge of each separator 117, are leak-tightly enclosed within the bottom 121 of the electrochemical generator to be produced, steps being preferably taken to likewise seal off the top of said generator.

Conveniently, the bottom 121 is made of wax or hardenable resin and may be produced by dipping the lower part of the structure just described (which includes the sides of the electrochemical generator and the electrodes mounted therebetween) into liquid resin or melted wax which is then allowed to set. The bottom can then be cut to the outer contour of said structure, whereby the lower electrode edges 111*f* and the lower edges of separator 117 are caused to be leaktightly trapped in said bottom 121. Preferably, the lower separator edgings 117*f* are made of non-porous plastic strip (polyvinyl chloride, for example) secured to the nylon fabric to avoid possible ascension of the liquid resin into the nylon fabric by capillarity during the process of forming the generator bottom, which would impair movement of the ions through the separator during operation of the generator.

The upper edges 111*d* of the supports 111 devoid of catalytic substance project above electrolyte level N, whereas the catalytic coatings on said supports are preferably completely submerged in the electrolyte. The top of the generator can be sealed off in the same way as bottom 121. The lid (not shown) is conveniently formed with holes for the passage of a wick 123 for each individual electrolytic cell, whereby to enable the water formed during the electrochemical reactions to be carried out of the generator. Wicks 123 project above the electrolyte level N and may be associated with advantage to one or more fans which are driven, for instance, by the current delivered by the generator and which enable the rate of evaporation through the wicks to be regulated. Manifestly, any other convenient means may be resorted to for evacuating, where necessary, the water formed during the electrochemical reactions, and these alternative means may for example be such as to cause electrolyte to circulate through said cells and to undergo an evaporation phase externally of the generator.

Said lid may also conveniently include holes for duct element 124*a* and 124*c* to discharge any bubbles which may form inside the electrolytic cells as the result of leaks or incomplete combustion of the gas fuel and oxidant fuel at the electrolyte/electrodes interface areas during the electrochemical reaction. Ducts 124*a* and 124*c* may additionally be utilized where necessary to fill the individual cells with electrolyte.

Duct elements 124*a* and 124*c* may have port, for example in two distinct compartments wherefrom the gases may be recycled if desired to compartments 104*a* and 104*c* respectively.

Figure 11:
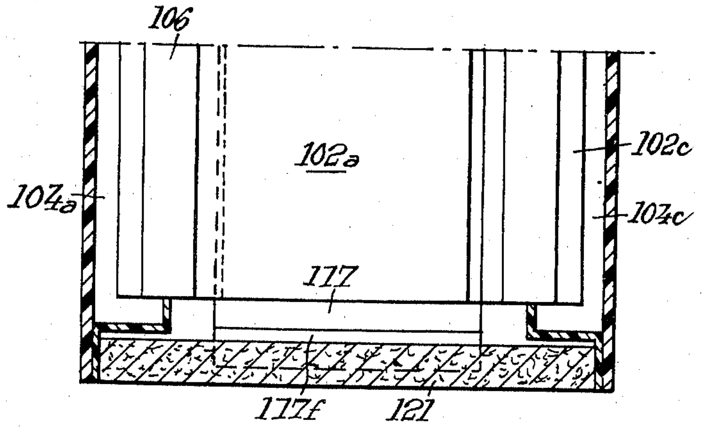
FIGURE 11 is a section taken on the vertical plan through XI—XI of FIGURE 10.

Reference is now had to FIGURES 10 and 11 for an example of an electrochemical generator of high power per unit weight designed to deliver a large quantity of current for a relatively small difference in potential, in which the cathodes and anodes are accordingly parallel connected.

The structure for the electrically conductive support of electrodes 102*a* and 102*c* may be a non-porous metal plate, a grid, or the like. Said electrodes are secured through only one of their sides to the partition walls 114*a* and 114*c* of compartments 104*a* and 104*c* through the medium of resin flanges 106, the anodes being mounted in wall 114*a* and the cathodes in wall 114*c*. The electrodes are parallel-connected as at 127*a* and 127*c* and electric current is collected across generator terminals 110*a* and 110*c*.

Separators 117 are formed by a single strip arranged accordion fashion in central compartment 103 to pass round the vertical edges 126*a* and 126*c* of electrodes 102*a* and 102*c*, respectively, in compartment 3. The lateral vertical edgings for separator 117 are preferably secured into the generator casing by bonding for example, between the contact surfaces of lateral partition walls 118 and of partition walls 115*a* and 115*c* respectively (or of flanges 128*a* and 128C between the enclosures bounding compartments 104*a* and 104*c*, as shown in FIGURE 10). The lower horizontal edging of separator 117 is conveniently restrained in generator bottom 121 as described precedingly, through the agency of a non-porous plastic strip 117*f*.

Figure 12:
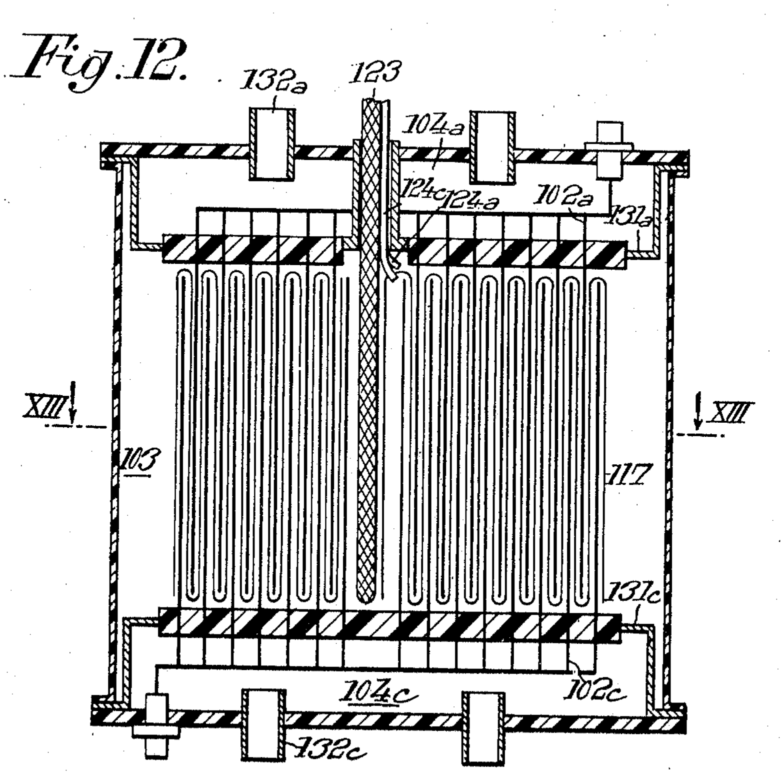
FIGURE 12 is a vertical section through an alternative constructional form of the electrochemical generator of FIGURE 10.
Figures 13, 14:
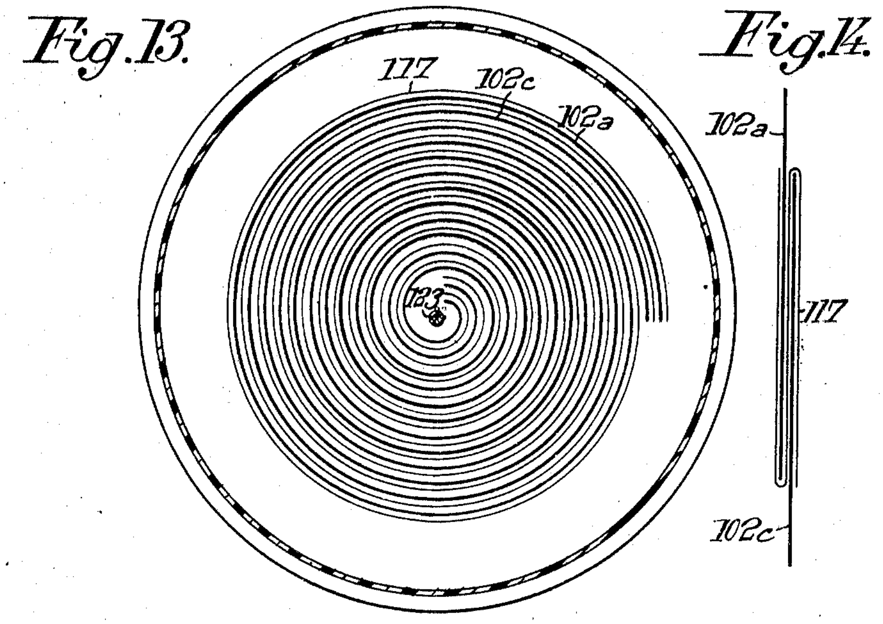
FIGURE 13 is a section on the horizontal plane through XIII—XIII of FIGURE 12.
FIGURE 14 shows in section a constructional detail of the embodiment of FIGURE 12.

Referring next to FIGURES 12 and 13 for another preferred form of embodiment, the generator shown thereon comprises a single anode 102*a* and a single cathode 102*c* formed into an interleaving double scroll, with a separator 117 being rolled therebetween to prevent direct contact between these electrodes, whereby there is provided a compact electrochemical generator having large electrode areas in contact with the electrolyte, resulting in the generating of high-intensity electric current.

In order to obtain such scroll electrode, the latter may be provided with electrically conductive deformable backings, example being metal or plastic grids rendered electrically conductive. The electrodes have formed thereon the resin deposits or flanges 106 described precedingly, and these flanges remain sufficiently malleable after setting to enable the electrodes to be rolled into scrolls. Facing flanges within the scroll may if necessary be bonded or welded to each other.

Preferably, separator 117 is rolled up together with the electrodes and left free therebetween. It is folded accordion fashion around electrodes 102*a* and 102*c* (FIG. 14) before the latter are wound into a scroll and mounted into enclosure elements 131*a* and 131*c* defining anode compartment 104*a* supplied with fuel gas through ports 132*a*, and cathode compartment 104*c* supplied with oxidant gas through ports 132*c*, in similar manner to that described hereinabove (see FIG. 9).

The generator devised thus likewise preferably includes a wick 123 or like means for evacuating the water possibly formed during the electrochemical reaction, and the electrodes are formed with holes therein (not shown) to enable the water formed everywhere in electrolyte-containing central compartment 103 to find its way to the wick. Further, debubbling ducts 134*a* and 134*c* are provided for communication with the anode and cathode chambers bounded by separator 117 and are effective in discharging possible gas bubbles formed in said chambers.

Figure 15:
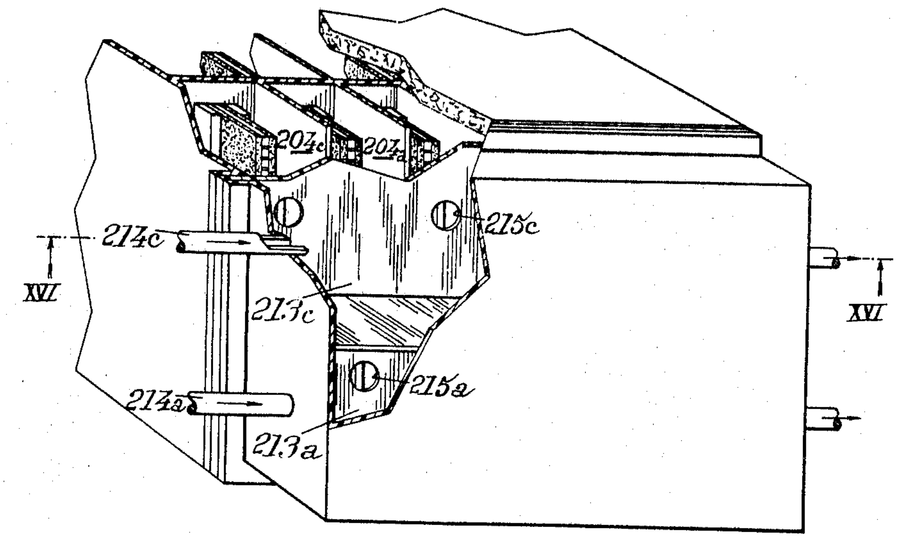
FIGURE 15 shows in perspective part of an alternative embodiment of an electrochemical generator according to the invention.
Figure 16:
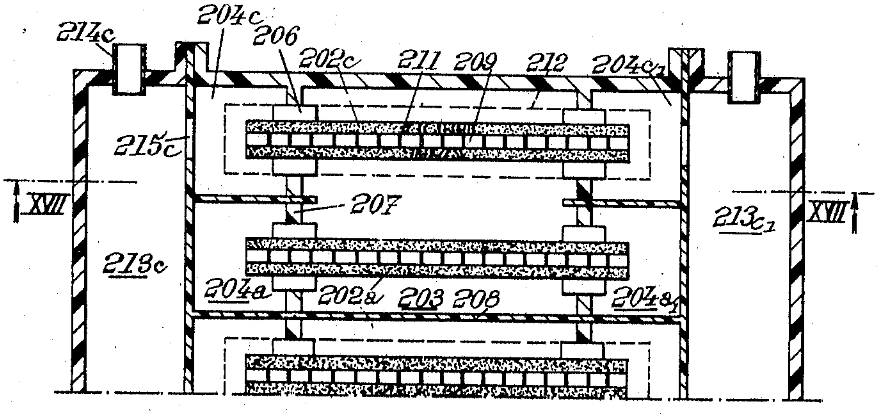
FIGURE 16 is a horizontal section through XVI—XVI of FIGURE 15.
Figure 17:
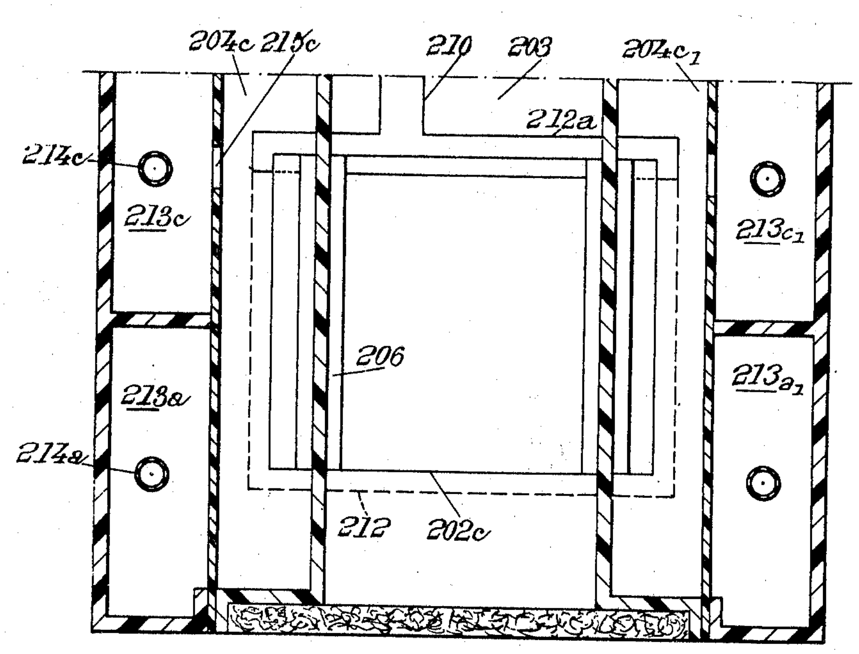
FIGURE 17 is a vertical section through the line XVII—XVII of FIGURE 16.

The constructional forms shown in FIGURES 15 to 17 embody additional features consisting—in addition to submerging the major central portion of each electrode in an electrolyte contained in the central compartment—in causing the opposite ends of each of one set at least of electrodes of identical polarity to project into two compartments of the generator supplied with the same gas (oxidant or fuel, depending on the polarity of the electrodes), and, in particular when such supply gas is a mixture of an active oxidant or fuel gas with a carrier gas (oxygen or nitrogen, say, when one of the supply gases in the generator is air), in maintaining the pressure of such gas at a somewhat higher pressure in one of said compartments than in the other.

Indeed it has been found, particularly in cases where one of the supply gases is a mixture of an active gas a carrier gas, that the greater the distance from the electrode area supplied with gas, the less effective is the diffusion process.

The resulting progressive gas starvation of the electrode/electrolyte interface areas within the electrode remote from the supply compartments can be partly explained in the case of pure gases (oxidants or fuels) by the texture of the catalytic coatings and the consumption of supply gas at the interface areas nearest the supply area. This inadequate diffusion becomes far more serious, however, in the case of a supply gas which includes large portions of an inactive carrier gas (such as nitrogen in the case of air), which heretofore had to be evacuated by diffusion back to the gas supply compartments. Such feedback evacuation may be comparatively ineffective in some cases and result in electrode starvation, which will turn cause the electrochemical processes to be slowed down, with a corresponding loss of electrochemical efficiency for the generator. This efficiency can be appreciably increased by causing two opposite edges of each electrode (the central portion of which is immersed in the electrolyte contained in compartment 3) to extend into two compartments 204*a* and 204*$a_1$* (or 204*c* and 204*$c_1$*) which are located on either side of central compartment 203, and supplied with the same gas, one of said two compartments 204*c* and 204*$c_1$*, most notably when the cathodes are supplied with air, having the gas (air) pressure prevailing therein (compartment 204*c* for example) slightly greater than that prevailing in the other compartment (204*$c_1$*).

This pressure differential, which may be of 20 g./cm.$^2$ for instance, must clearly be adjusted in order to obviate bubbling at the electrode/electrolyte interfaces; however, the maximum pressure differential applicable to the two ends of the electrodes can readily be determined by the specialist in the art according to the size of the electrochemical generator.

This effectively avoids the accumulation of nitrogen in the cathode, since its diffusion is facilitated and steered from compartment 204*c* to compartment 204*$c_1$*, whereby a much larger electrochemically active zone of interfacial contact is achieved. The increase in generator efficiency is all the more marked in that the partial pressure of the oxygen in the air diffusing through the body of the catalyst is low, so that the propensity for producing energy is more closely bound up with the importance of the active zone available for the electrochemical reaction than in the case of the anode supplied with pure hydrogen.

It would, however, also be possible to supply each anode with hydrogen at each end thereof, thereby doubling the electrochemically active zone of the anode, since it is advantageous from the power per unit weight standpoint to increase the electrochemically active zone of the anode in this manner without substantially increasing the weight of the generator. In such a generator, polarization is especially marked at the cathode, due to the latter being supplied with a diluted reactant, whilst the greater the electrochemically active zone of the anode the lower the degree of anode polarization. Such reduction of the anode polarization to a minimum results in an increased difference in potential available across electrodes of opposite polarity and in a consequent increase, proportional to this difference in potential, in the power delivered by the generator.

FIGURES 15 to 17 illustrate an electrochemical generator in which the cathodes and anodes are supplied with air and hydrogen respectively and are respectively intended for series connection.

As FIGURE 16 clearly shows, such a generator includes a series of individual cells segregated from one another by internal leaktight partition walls 208 and made for example of a material such as that known under the trade name Lucoflex.

Each cell includes a central compartment 203 containing the electrolyte, in which are immersed the major portions of an anode and a cathode which project, respectively, on either side of said central compartment, into flanking anode compartments 204*a* and 204*$a_1$* and cathode compartments 204*c* and 204*$c_1$*. Segregation between central compartment 203 and the flanking compartments is achieved by means of leak-tight resin deposits 206 which interconnect adjacent electrodes either directly or through the medium of connecting elements 207.

As in the previous constructional forms, the electrodes include an electrically conductive support 209, preferably consisting of a metal grid made, for instance, of nickel and covered on both sides with palladized active carbon in the case of the anodes and silvered active carbon in that of the cathodes. The porosity of the catalytic electrode coatings (represented in FIGURE 2 by a multiplicity of small passages 211), together with the fact that these electrodes are completely impregnated with electrolyte, ensures free flow of the latter through the electrodes, from one side to the other thereof, whereby the two opposite surfaces of each electrode contribute towards the electrochemical reaction.

Likewise provided between electrodes of opposite polarity are separators 202 consisting say, as precedingly, of porous nylon fabrics with non-porous plastic edgings, made for example of polyvinyl chloride and restrained, on one hand, between resin deposits 206 and said connecting elements 207, and, on the other, in the generator bottom, as hereinbefore described.

Alternatively, the separator may consist of bags 212 made of porous nylon fabric and surrounding every second electrode (see FIGS. 16 and 17). Conveniently, such bags may include a gastight portion 212*a* at their tops, and said portion includes a likewise gastight vent 210 projecting above the liquid electrolyte level to permit of discharging any gas bubbles formed at the electrode/electrolyte interfaces.

As previously indicated, the water formed during the electrochemical reaction may be evacuated, as precedingly indicated, by the use of wicks (not shown) or means (likewise not shown) for enabling the electrolyte to pass through the several cells from an external source.

The supply of air and hydrogen to cathode and anode compartments 204*c* and 204*a* respectively, positioned on the same side of central compartment 203 and arranged in alternating polarities, may be accomplished by providing a single supply means for each gas, on either side of the generator sides. Use may accordingly be made of two superimposed supply enclosures 213*c* and 213*a* arranged externally on one side of the generator, with these enclosures being common to the cathode and anode compartments 204*c* and 204*a* respectively. Two further similar superimposed enclosures are provided on the other side of the generator. Each of external compartments 213*c* and 213*a*, into which air and hydrogen penetrate through inlet conduits 214*c* and 214*a*, communicates only with the corresponding cathode or anode compartment 204*c* or 204*a*, respectively, through openings 215*c* and 215*a* (see FIG. 16). This also applies to the other side of the generator. In the exemplary form of construction shown in the drawings, enclosures 213*a* and 213$a_1$ are both supplied with hydrogen at the same pressure, whereas enclosures 213*c* and 213$c_1$ are supplied with air at a pressure adjusted slightly higher in enclosure 213*c*, for instance, than in enclosure 213$c_1$.

Compartments 204*c* and 204$c_1$ can thus readily be supplied with oxygen at slightly different pressures, whereby the flow of the nitrogen from compartments 204*c* to compartments 204$c_1$ is facilitated.

In yet another form of embodiment of such an electrochemical generator, wherein the electrodes are series-connected, the intermediate partition walls 208 can be dispensed with provided that, instead of consisting of a metal grid, each support 209 is a leaktight plate made of plastic covered on each side with an electrically conductive metallic deposit.

Lastly, an electrochemical generator delivering low-voltage current of high intensity can be obtained by parallel-connecting the electrodes of the generator portrayed in the constructional form of FIGURES 15 to 17, while at the same time dispensing with the transverse partition walls 208, if desired.

Concerning the generators particularly hereabove described it is believed that the particular distributions of the areas of simultaneous contact between the electrode, the electrolyte and the supply gas is due, to the fact that the electrolyte is permitted to penetrate the electrode through the interstices between adjacent particles, the active carbon particles further comprising micropores not penetrated by the liquid electrolyte but filled with gas the diffusion of which occurs from particle to particle either by direct contact or along binding agent.

While particular embodiments of the invention have been envisaged hereabove the invention is not limited thereto and is intended to cover all modifications, alternatives as comprehended within the scope of the claims.

What is claimed is:

1. An electrochemical generator comprising: an anode; a cathode; means defining a gas compartment; and means defining a liquid electrolyte compartment; said compartments being constructed and arranged next to and separate from each other such that the gas in said gas compartment is out of contact with liquid electrolyte in said liquid electrolyte compartment; at least one electrode of the generator being fixed and including an electrically conductive support covered with a porous material supporting the catalyst for the electrochemical reaction and exhibiting a porosity such that said liquid electrolyte can penetrate the electrode and such that said gas in the gas compartment can diffuse therein, said fixed electrode including a first, active zone, portion projecting into and being at least partially submerged in liquid electrolyte in said liquid electrolyte compartment, and a second, supply zone, portion projecting into said gas compartment, whereby the gas from the gas compartment is adsorbed in the supply portion of said electrode projecting into said gas compartment can diffuse within said porous material of said fixed electrode from said gas compartment into the active portion of said fixed electrode submerged in said electrolyte in a direction generally parallel to the outer faces of said fixed electrode, said gas compartment including means constructed and arranged for preventing the gas in said gas compartment from passing into said electrolyte compartment other than through said fixed electrode.

2. An electrochemical generator according to claim 1 wherein said porous material of said fixed electrode comprises active carbon.

3. An electrochemical generator according to claim 1 wherein said supply zone of said fixed electrode is small relative to the active zone thereof.

4. An electrochemical generator according to claim 1 wherein said fixed electrode is an anode comprising a nickel grid and palladized active carbon.

5. An electrochemical generator according to claim 1 wherein said fixed electrode is a cathode comprising an electrically conductive support of a metal selected from the group consisting of silver and nickel and said porous material comprises silvered active carbon.

6. An electrochemical generator according to claim 1 which comprises a partition structure, in which are formed passageways for said fixed electrode, separating said liquid and gas compartments, said electrode extending through said partition, and resin deposits, formed on the region of the electrode separating said active portion submerged in the electrolyte from said supply portion projecting into said gas compartment, joining said electrode to said partition structure, said resin having a penetration capacity into the porous substance of the electrode limited at most to part of the thickness thereof and forming therewith a leakproof joint.

7. An electrochemical generator according to claim 6 which comprises two gas compartments disposed on either side of said electrolyte compartment, said electrolyte compartment defining a central compartment and said gas compartments defining opposite lateral compartments.

8. An electrochemical generator according to claim 7 wherein one of the lateral compartments is supplied with a gaseous oxidant and the other lateral compartment is supplied with a gaseous fuel, and which comprises a plurality of said fixed electrodes including cathodes and anodes having said supply portions projecting respectively in said one and other lateral compartments and said active portions submerged in the electrolyte, within said central compartment, in alternating arrangement.

9. An electrochemical generator according to claim 8 wherein the resin deposits on the neighboring electrodes having the same polarity join together to form part of the partition separating said central compartment from the corresponding lateral compartment.

10. An electrochemical generator according to claim 7 wherein at least one of the fixed electrodes extends through the partition structure separating the lateral gas compartments from the central electrolyte compartment on either side thereof, the lateral compartments being supplied with the same supply gas, in conformity with the polarity of the electrode considered, the pressure in one of the lateral compartments being maintained at a slightly greater value than in the other and opposite lateral compartment.

11. An electrochemical generator according to claim 10 wherein the said electrode is a cathode and including air supply means to supply the opposite lateral compartments with air.

12. An electrochemical generator according to claim 10 comprising a plurality of cathodes and a plurality of anodes, the submerged, active portions of the former alternating with the submerged active portions of the latter in the central electrolyte compartment, the opposite edges of each of the electrodes projecting into individual opposite lateral gas compartments supplied with air, in the case of the cathodes, and with hydrogen, in the case of the anodes, a slight difference of pressure being maintained in the individual opposite lateral gas compartments into which project the opposite edges of a same electrode.

13. An electrochemical generator according to claim 12 wherein the individual lateral gas compartments supplied with air, on each side of the central electrolyte compartment, are fed from a common air supply under a predetermined pressure and wherein the individual compartments supplied with hydrogen, on each side of the central compartment, are fed from a common hydrogen supply under a predetermined pressure.

14. An electrochemical generator according to claim 1 wherein said anode and cathode are each fixed electrodes formed as scrolls.

References Cited

UNITED STATES PATENTS

| | | | |
|---|---|---|---|
| 3,115,427 | 12/1963 | Rightmire | 136—86 |
| 3,134,696 | 5/1964 | Douglas et al. | 136—86 |
| 3,252,838 | 5/1966 | Huber et al. | 136—86 |
| 3,252,839 | 5/1966 | Langer et al. | 136—86 |
| 3,305,400 | 2/1967 | Barber et al. | 136—86 X |
| 3,261,717 | 7/1966 | Shropshire et al. | 136—86 |
| 3,323,951 | 6/1967 | Kreiselmaier | 136—86 X |

ALLEN B. CURTIS, Primary Examiner

U.S. Cl. X.R.

136—121